(12) United States Patent
Degady et al.

(10) Patent No.: US 6,168,306 B1
(45) Date of Patent: Jan. 2, 2001

(54) ADAPTER MEMBER FOR CONNECTING EXTRUDERS

(75) Inventors: Marc Degady, Morris Plains, NJ (US); Kevin R. Tebrinke, Fort Madison, IA (US); James A. Duggan, Machesney Park, IL (US); Susan B. Filardo, Tuxedo, NY (US); Tony R. Puri, Sparta, NJ (US); Arthur W. Upmann, Rockton, IL (US)

(73) Assignee: Warner-Lambert Company, Morris Plains, NJ (US)

( * ) Notice: Under 35 U.S.C. 154(b), the term of this patent shall be extended for 0 days.

(21) Appl. No.: 09/185,787

(22) Filed: Nov. 4, 1998

Related U.S. Application Data

(62) Division of application No. 08/725,359, filed on Oct. 3, 1996, now Pat. No. 5,837,302.

(51) Int. Cl.⁷ .................................................. B29C 47/66
(52) U.S. Cl. .................... 366/76.1; 366/76.3; 425/192 R
(58) Field of Search ........................... 366/69, 76.1, 76.3, 366/76.4, 76.6, 76.93, 156.2; 425/204, 192 R, 190

(56) References Cited

U.S. PATENT DOCUMENTS

| | | |
|---|---|---|
| 4,555,407 * | 11/1985 | Kramer et al. . |
| 4,597,537 | 7/1986 | Misaka et al. . |
| 4,753,805 | 6/1988 | Cherukuri . |
| 4,764,020 * | 8/1988 | Moriyama . |
| 4,816,265 * | 3/1989 | Cherukuri et al. . |
| 4,850,842 | 7/1989 | Van Alstine . |
| 5,000,965 * | 3/1991 | Killeen et al. . |
| 5,045,325 * | 9/1991 | Lesko et al. . |
| 5,057,328 | 10/1991 | Cherukuri . |
| 5,116,627 | 5/1992 | Rutherford . |
| 5,124,160 | 6/1992 | Zibell . |
| 5,135,760 * | 8/1992 | Degady et al. . |
| 5,248,228 | 9/1993 | Giardina . |
| 5,397,580 | 3/1995 | Song . |
| 5,419,919 | 5/1995 | Song . |
| 5,486,366 | 1/1996 | Song . |
| 5,523,097 | 6/1996 | Song . |
| 5,543,160 | 8/1996 | Song . |
| 5,562,936 | 10/1996 | Song . |
| 5,728,411 | 3/1998 | Fowler . |

FOREIGN PATENT DOCUMENTS

| | | |
|---|---|---|
| 0 273 809 | 7/1988 | (EP) . |
| 2 635 411 | 2/1990 | (FR) . |
| 1 357 491 | 6/1974 | (GB) . |
| WO 96 08158 | 3/1996 | (WO) . |
| WO 96 28042 | 9/1996 | (WO) . |

* cited by examiner

Primary Examiner—Tony G. Soohoo

(57) ABSTRACT

A process and apparatus for processing polyvinylacetate and other similar ingredients of a gum base or chewing gum product are disclosed. The ingredient materials are separated into individual pieces by a lump breaker and conveyed through a pneumatic conveying system to a cyclone receiver and holding bin. A volumetric feeder feeds the material into a side feeder which in turn introduces and feeds the material to the main continuous extruder used for making the final gum base or gum product. A unique adapter with a curved outer end shape connects the side feeder to the main extruder internal bone which allows repair and/or modification of the side feeder without separating it from the main extruder.

2 Claims, 3 Drawing Sheets

ADAPTER MEMBER FOR CONNECTING EXTRUDERS

This is a divisional of application Ser. No. 08/725,359 filed on Oct. 3, 1996 now U.S. Pat. No. 5,837,302.

TECHNICAL FIELD

The invention is directed to an apparatus and method for the processing of polyvinyl acetate for use in chewing gum and chewing gum bases.

BACKGROUND OF THE INVENTION

There are several systems known today for producing chewing gum bases and the final chewing gum products. Typically, a chewing gum base is made separately from the final chewing gum, although there are some systems which are capable of producing a final chewing gum product in one continuous process.

In general, a chewing gum composition typically comprises a water-soluble bulk portion, a water-insoluble chewing gum base portion, and typically water-insoluble flavoring agents. The insoluble gum base generally comprises elastomers, elastomer solvent, fillers, resins, polyvinyl acetate (PVA), fats, plasticizers, waxes, emulsifiers, and other miscellaneous ingredients. The water-soluble portion dissipates with a portion of the flavoring agent over a period of time during chewing. The gum base portion is retained in the mouth throughout the time that the product chewed.

Numerous chewing gums and chewing gum bases are produced using a batch method. Sigma blade batch mixers are typically used for this conventional process. The gum base ingredients are added either separately or simultaneously into the batch mixer and the material is then melted and mixed over time. After the gum base is processed, the molten gum base batch is emptied into coated or lined pans, or pumped to other equipment such as holding tanks or a filling device, then extruded or cast into shapes, and allowed to cool and solidify, before being ready for use in chewing gum.

The final chewing gum product can also be processed using a batch method. A portion of the gum base, together with softeners and bulking agents, such as sugars or sugar alcohols, are added to the mixer. Later, flavorings such as flavored oils and/or spraydried flavors, sweeteners or acids are added while mixing is continued until a homogeneous mass is achieved. Delivery systems of this type are shown, for example, in U.S. Pat. Nos. 4,816,265, 5,000,965 and 5,057,328. The chewing gum mass is then cooled and later rolled, scored, and wrapped into the final product.

Continuous extrusion machines can also be used for producing chewing gum bases or the final chewing gum products, or both. The use of continuous extruders to make a final chewing gum product are shown, for example, in U.S. Pat. No. 5,135,760 to Degady et al.; U.S. Pat. No. 5,045,325 to Lesko et al.; and U.S. Pat. No. 4,555,407 to Kramer et al. Processes known in the art for continuously producing a chewing gum base with the use of a continuous extrusion machine are shown, for example, in U.S. Pat. Nos. 5,419,919 and 5,486,366, both to Song et al.

The continuous gum base and chewing gum product processes disclosed in these patents typically utilize a continuous extrusion machine, such as a twin-screw extruder. These extruders typically have several different feed inlets where the ingredients are added. The elongated screws inside the barrels of the extruders are equipped with different types of elements. Continuous extrusion machines which can be used for producing chewing gum bases and final chewing gum products include extruders from Togum, Baker Perkins, Werner & Pfleiderer Corp., Japan Steel Works, Leistriztz, WLS and Buss Mfg. Co.

Whether a batch-type process or a continuous extruder-type process is used to produce the chewing gum and gum base products, it is important to provide the various ingredients for these products in the best form and condition. This improves the speed and efficiency of the final processing, and also improves the uniformity and consistency of the final product. In this regard, ingredients such as fillers, elastomers, plasticizers, resins, PVA, oils, waxes, and the like, often require special handling or preparation prior to being included in the batch or extrusion process.

Preparation of the ingredients is especially important where continuous extrusion processing is utilized. The ingredients applied to the continuous extrusion apparatus are preferably provided in the optimum size, shape, condition (liquid, solid, etc.), and temperature for ease of insertion and intermixing with the other ingredients in the extruder.

In order to achieve a homogeneous phase gum base or gum product wherein a proper resiliency is constant throughout and the product is free from lumps and other irregularities, it is necessary to provide the ingredients which are compatible with one another and are as dispersed and distributed as much as possible in the materials being processed. Processing and environmental conditions, such as temperature, humidity, and the like, must also be considered and taken into account in preparing a useable gum or gum base product.

Several of the ingredients typically used in chewing gum and gum base products, such as elastomers, solid resins, plasticizers and elastomeric solvents, are often difficult to handle and process. One material commonly used in the chewing gum products is polyvinylacetate (PVA). This material can be used as a resin, plasticizer or elastomer solvent for the gum and gum base products. A plasticizer is often also referred to as a softener.

PVA material is typically provided in solid form, namely as individual wafers, pastilles, pellets or small pieces packed in a bag or other container. That material, which is tacky and thus difficult to process with automatic equipment, typically needs to be inserted into a continuous extrusion machine in individual small pieces. Also, it is often necessary to insert PVA and similar materials through a side feeder into the main extruder. In this manner, the material can be inserted in solid small particle form at the appropriate point or stage of the extrusion process. Side feeders of this type are available, for example, from Buss Mfg. Co., Werner & Pfleiderer Corp. and Baker Perkins.

Further, when using a side feeder, it is often difficult to clean or maintain the feeder apparatus without physically moving the entire apparatus away from the main extruder.

It is a general object of the present invention to provide an improved method and apparatus for the production of chewing gum products and gum base products. It is also an object of the present invention to provide improved apparatus and methods for preparation of certain chewing gum and gum base ingredients prior to processing in order to facilitate improved processing and an improved final product.

It is still another object of the present invention to provide a method and apparatus for continuously preparing chewing gum bases and products which have a consistent and uniform composition. It is another object of the present invention to provide an improved process and apparatus for supplying chewing gum base and chewing gum product ingredients, particularly PVA, to a continuous extruder in an optimum condition and form in order to provide a consistent and uniform final product.

It is still another object of the present invention to provide an improved adapter mechanism for operationally connecting a side feeder extrusion apparatus to a main extrusion apparatus.

These and other objects, benefits, and advantages are met by the following description of a preferred form of the invention.

SUMMARY OF THE INVENTION

The present invention provides an improved apparatus and process for producing a gum base and the final chewing gum product. A novel process and apparatus and system are used to handle and process several of the hard-to-handle ingredients for a continuous gum making system. These ingredients include, for example, resins, plasticizers and elastomeric solvents, including, in particular, polyvinylacetate (PVA).

In accordance with the present invention, a low-speed lump breaking apparatus is utilized to break up and divide the PVA or like material into small individual pieces. The lump breaker has a rotating blade which separates the particles into their original individual piece or wafer-like form. The removed material is pneumatically conveyed to a feeding system for a side feeder to the main extruder. The material is stripped from the pneumatic conveying air by a cyclone receiver and fed by gravity into a holding receiver. The holding receiver acts as a holding bin which releases the material through a computer control valve and a volumetric loss-in-weight feeder.

A magnetic metal detector is used to remove any metallic impurities from the material. The material is inserted into the barrel of the main extruder and intermixed and intermelted with the molten mass to form the final gum base or chewing gum product.

Throughout the process in accordance with the present invention, the material is kept at a low temperature and is physically and manually handled as little as possible. In this manner, the material, such as PVA, remains in a solid, unmelted condition and is eventually conveyed into the main extruder in the desired condition for further processing.

An adapter mechanism is used to connect and join together the side feeder with the main extruder. The adapter allows the elongated shafts in the side feeder to be retracted and maintained without separation of the two extruders.

With the present invention, a better quality final product is secured. The extrusion process is more consistent since the rates of speed and temperatures in the various stages of the extruder and the ingredients are kept to their optimum level for further processing.

These and other features, advantages and benefits to the present invention will become apparent from a review of the following description, when taken in view of the accompanying drawings and appended claims.

BEST MODES FOR CARRYING OUT THE INVENTION

The present invention is particularly suitable for processing solid ingredients, such as polyvinylacetate (PVA), for use in chewing gum bases and chewing gum products. In general, the present invention provides an apparatus, method and system for processing the ingredients in order to facilitate their introduction into a chewing gum base or chewing gum product in an optimum manner and condition. This optimum condition allows the chewing gum or gum base manufacturing process to provide a more consistent and uniform final product.

In this regard, it is to be understood that the present invention can be used for preparing the solid components of either a chewing gum base or a final chewing gum product and can be used with either a batchtype system or a continuous extruder-type system. In the preferred embodiment of the present invention, however, and for ease in illustrating the present invention, it will be described herein with reference to its use in a continuous gum base manufacturing system.

Figure 1:
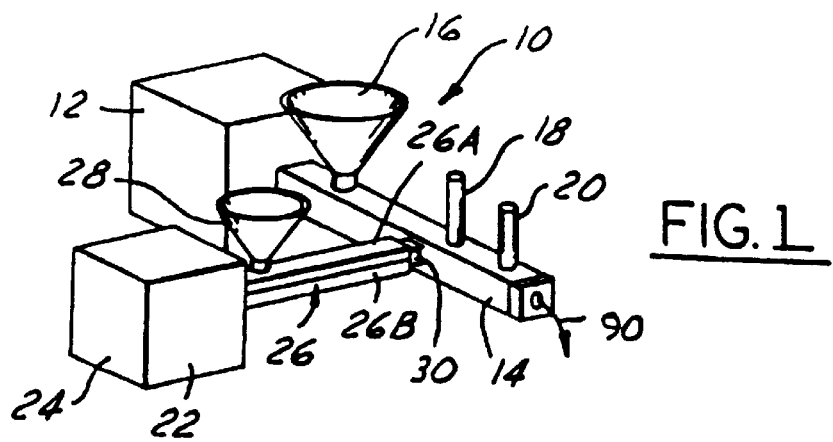
FIG. 1 is a schematic diagram of a chewing gum or gum base process in accordance with the present invention.
Figure 2:
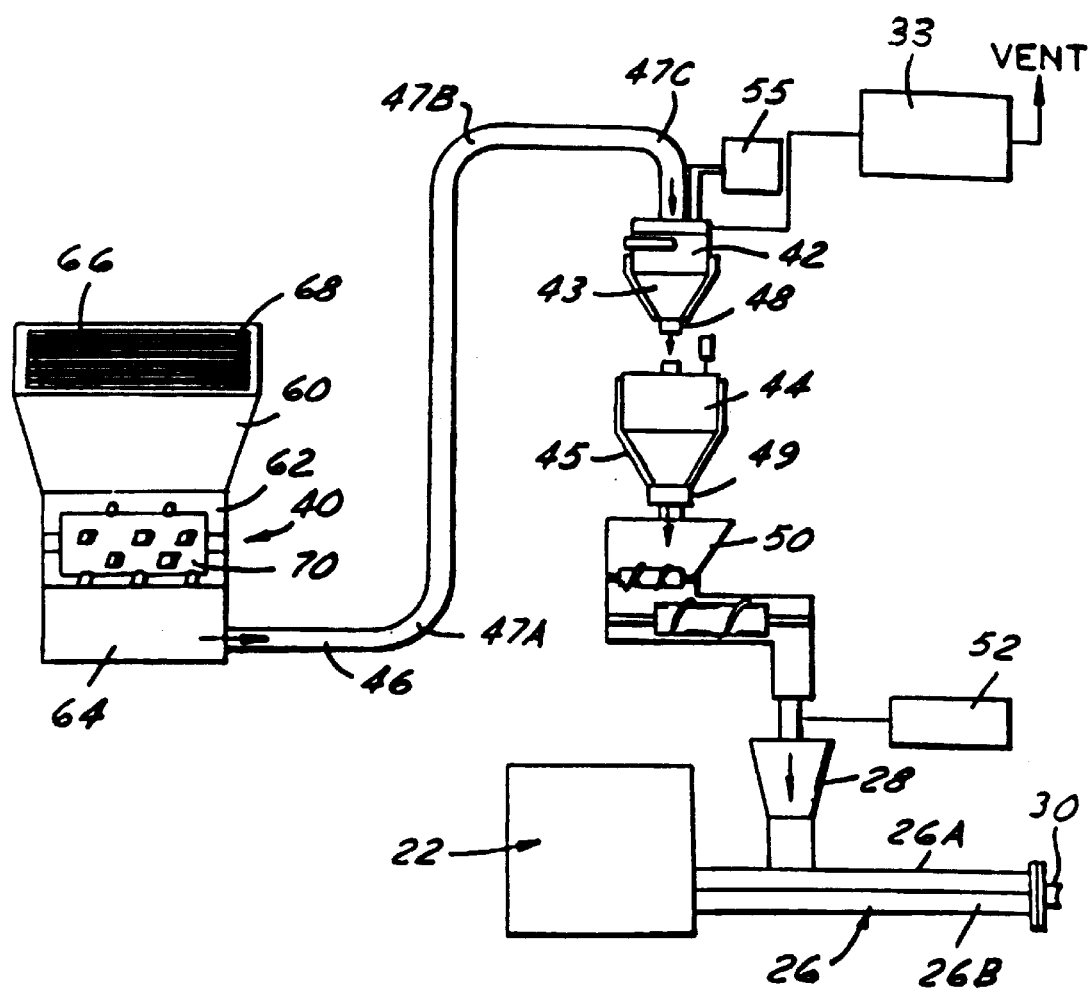
FIG. 2 is a schematic diagram of a PVA processing system in accordance with the present invention.
Figure 3:
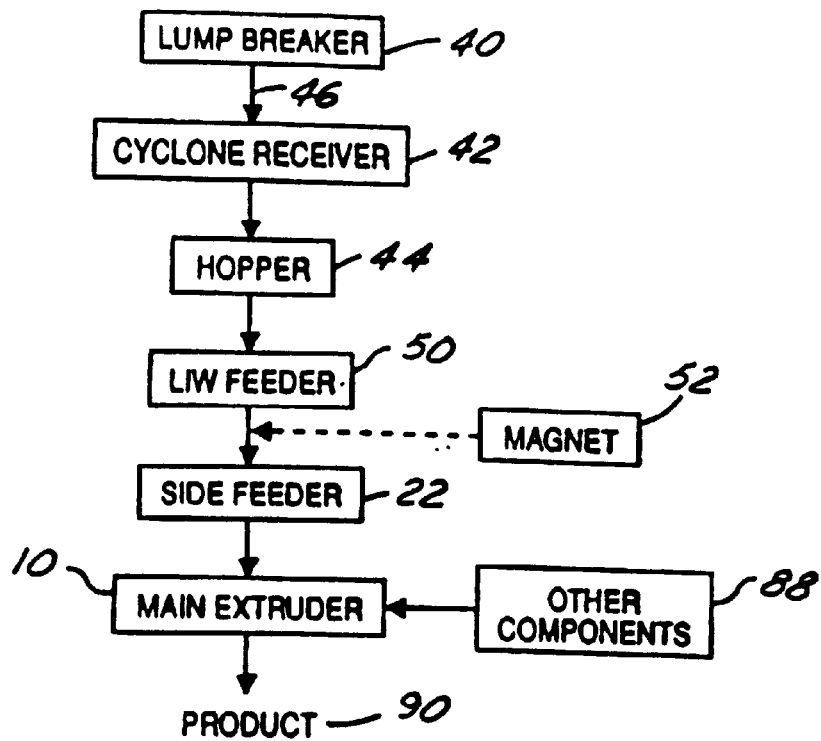
FIG. 3 is a flow diagram of a PVA processing system in accordance with the present invention.
Figure 4:
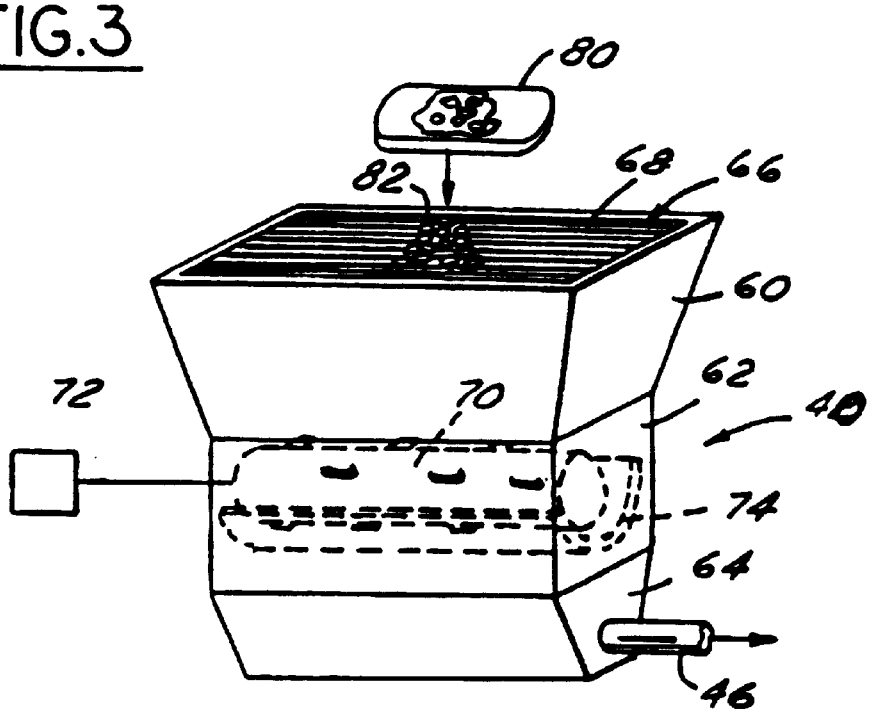
FIG. 4 is a schematic drawing of a lump breaker apparatus in accordance with the present invention.
Figure 5:
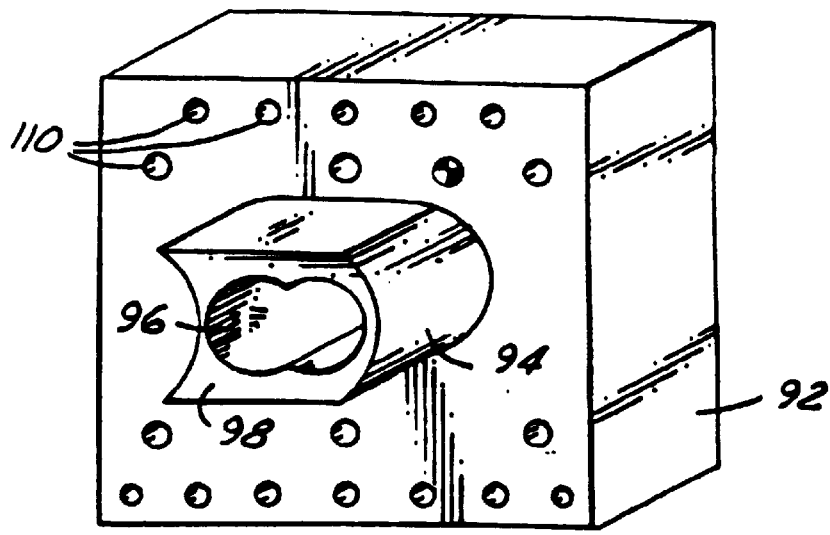
FIGS. 5–7 illustrate an unique adapter mechanism for use with the present invention.
Figures 6, 7:
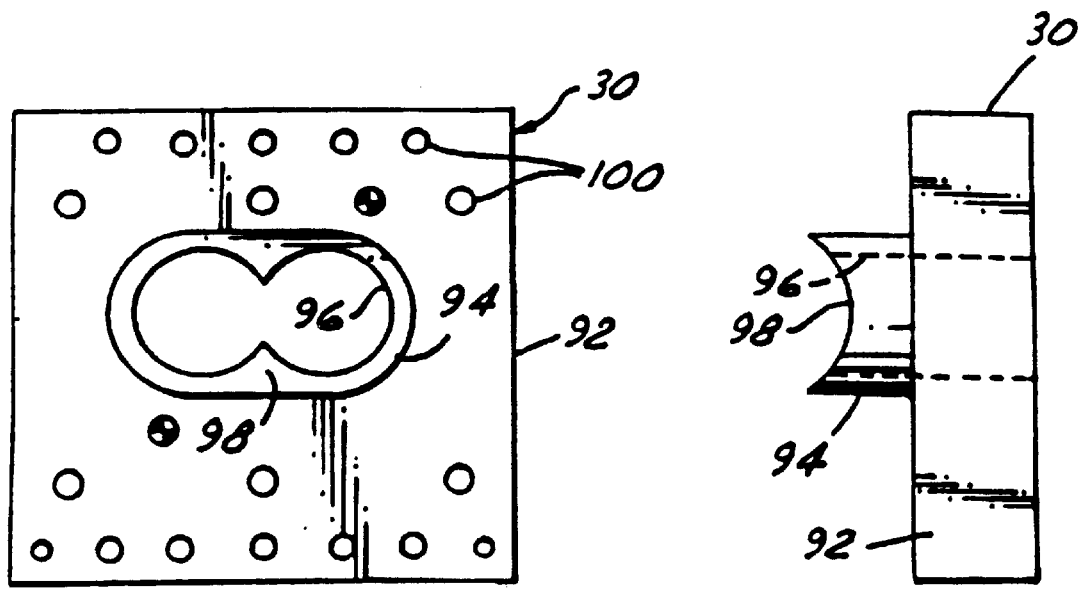

Schematic illustrations of the apparatus and system of the present invention are illustrated in FIGS. 1 and 2. A flow chart illustrating the basic processing steps of the present invention is depicted in FIG. 3, and a lump breaker apparatus for use with the present invention is shown in FIG. 4. Finally, FIGS. 5–7 illustrate an unique adapter mechanism for use in connecting a side feeder to a main extruder in accordance with the present invention.

It is known today to use continuous extruding equipment to produce chewing gum bases and final chewing gum products. An extruder 10 of this type is illustrated in FIG. 1. The extruder, which can be of any conventional type, has a motor and control mechanism 12 and an elongated barrel member 14. The continuous extrusion can be of conventional type from any extruder manufacture known today, such as Japan Steel Works, Leistriztz, Werner & Pfleiderer Corp., Togum, WLS, Baker Perkins and Buss Mfg. Co.

Typically, the continuous extrusion machines use twin-screw extruders which are either co-rotational, counter-rotational, intermeshing or tangential. These extruders have one or two elongated screw members in the barrels 14 which intermix and process the ingredients and materials for the gum base and/or the final gum product. The elongated screw members have different types of screw elements on them for processing the materials. The most common types of screw elements include conveying elements, compression elements, reverse conveyance elements, homogenizing elements such as shearing disks and tooth elements, and kneading disks and kneading blocks. These elements, and other elements typically used in extruding machines, especially twinscrew extruders, are well known in the art and commercially available. The elements are often specifically designed for the particular type of extruder utilized and the particular type of ingredients utilized in the final desired product.

The extruders typically have several different feed inlets where the ingredients are added. For example, as shown in FIG. 1, the extruder 10 has a first feed inlet 16 and two other inlets 18 and 20 positioned downstream on the barrel. Typically, solid ingredients, such as elastomers, fillers, and elastomer solvents, and plasticizers are introduced into the barrel through inlet port 16. Other ingredients, usually in a liquid condition, are added in the downstream ports 18 and 20. These other ingredients include waxes, oils, and the like.

In order to introduce certain resins, PVA, plasticizers and/or elastomeric solvents, also in a solid condition, to the extrusion process, it is often desirable to utilize a side feeder, such as the side feeder 22 shown in FIG. 1. In this regard, the side feeder can be any conventional extrusion apparatus, such as those available from Buss Mfg. Co., Baker Perkins and Werner & Pfleiderer Corp. The side feeder has a motor and control mechanism 24 and an elongated barrel 26. An inlet chute 28 is used to supply materials to the side feeder.

The side feeder 22 is connected to the main extruder with an adapter mechanism 30. (Further details of the adapter mechanism 30 are discussed below with reference to FIGS. 5–7). Also, the barrel of the side feeder has an upper and lower section, indicated by reference numerals 26A and 26B, respectively. A single or twin-screw mechanism (not shown) is positioned in the barrel 26 of the side feeder 22. Upper section 26A of the barrel housing is adapted to be pivoted or removed in order to allow access to the elongated screws.

The preferred process and system for the PVA and like materials in order to prepare them for input into the inlet port 28 of the side feeder 22 is shown in FIG. 2. A lump breaking apparatus or mechanism 40 is used to separate and prepare the materials for conveying to a cyclone receiver 42 and a holding receiver 44. In this regard, the material is conveyed from the lump breaking mechanism 40 to the cyclone receiver 42 by air conveying system 46. The cyclone receiver strips the pneumatic conveying air from the material and feeds the material by gravity through a valve member 48 into the holding receiver 44. The receiver 44 acts as a holding bin which releases the material by a computer-controlled valve 49 to a loss-in-weight (LIW) feeder 50. The LIW feeder 50 retains the material in the hopper 44 until it is needed in the side feeder 22 and main extruder 12. A magnetic metal detector 52 is used to separate metal impurities from the flow of material as it passes from the feeder 50 into the inlet chute 28 of the side feeder.

A blower 33 is used to exhaust air from the cyclone receiver (a/k/a centrifugal separator) 42. The air in the blower is vented to the atmosphere.

The details of the lump breaker mechanism 40 are depicted in FIGS. 2 and 4. The mechanism 40 includes an inlet chute or housing 60, a main body 62, and a lower conveying section 64. The open end 66 of the inlet housing 60 is covered by a grate 68. A rotating separator/lump breaker member 70 is positioned in the main body section 62. The rotating separator operates at a low speed and is controlled by a motor and controlling mechanism 72. A grate 74 is positioned below the separator 70 and separates the main body housing 62 from the conveying section 64.

In the operation of the lump breaker 40, bags of solid particulate material 80 are opened above the grate 68 and the contents 82 dropped onto and through the grate. If the material is polyvinylacetate (PVA), it is typically provided in small wafer-like pieces. However, due to the consistency and melt temperature of PVA material, the wafers are typically massed and stuck together and thus the material is removed from the bags 80 in various size lumps, for the most part.

The lumps of material 82 are manually and physically pushed through the grate 68 and into the inlet chute 60. The lumps are then dropped onto the rotating separator 70 which agitates and divides the wafer-like materials into individual pieces. The individual pieces are then passed in turn through grate 74 into the conveying section 64. At that point, the wafer members are transported from the conveying section 64 by the air conveying system 46.

A flow chart showing the basic processing steps of the present invention is shown in FIG. 3. The PVA material is first introduced into the lump breaker 40 where it is divided and separated into its individual particles or pieces. From there, the individual pieces are conveyed through pneumatic conveying system 46 to the cyclone receiver 42. From there, the materials are fed by gravity to hopper or holding bin 44.

Loss-in-weight (LIW) feeder 50 regulates the flow of the PVA material into the side feeder 22. A magnetic or metal detector 52 is used to separate impurities from the PVA material at that point. It is also possible to include a lubrication or dusting agent, such as talc, atomite, dicalcium phosphate or the like, to the PVA pieces. The lubricating agent can be added at any point in the inventive process and can be accomplished with use of any conventional feeder apparatus, such as apparatus 55 in FIG. 2.

Once the material is in the side feeder, it is conveyed by the elongated screws in the barrel 26 to the main extruder 10. At this point, other ingredients and components 88 for the final chewing gum base or chewing gum product are added to the main extruder. The final product 90 is extruded from the extruder 10.

In accordance with the present invention, the side feeder unit 22 is preferably capable of feeding 2000pounds per hour of resin material to the main feeder. At the same time, the present inventive system, including the side feeder, maintains the material in a cooled condition sufficient to maintain a consistent and uniform feed into the continuous processor.

In accordance with the present invention, it is is important to handle the material as little as possible and prevent heat from being generated in the system. For this purpose, the air used with the pneumatic conveying system 46 is kept at a cool or low temperature, for example, 50° to 75° F. Also, the corners or curves in the conveying system 46, such as corners 47A, 47B and 47C in FIG. 2, are kept at a large radius. A large radius is used in order to allow the material to pass through the conveying conduits more quickly and without significant resistance which might generate unacceptable heat.

With the present invention, the PVA material is separated into solid members (wafers, pastilles, pellets, or the like), maintained in that separated condition throughout the system, and then introduced into the main extruder also in that same condition. By controlling the temperature throughout the process, and providing the material in a separated state, the rate of feed of the material and the amount of material added to the main extruder can be precisely controlled. This results in a better quality and more uniform and consistent final product.

Preferably, the major components of the system are made of a stainless steel material. This includes at least the lump breaker mechanism 40, the conduits used in the conveying system 46, the cyclone receiver 42, the receiver 44, and the loss-in-weight feeder 50. Also, as part of the temperature control system, the cyclone receiver 42 and holding receiver 44 are cooled by external water jackets 43 and 45, respectively.

The details of the unique adapter 30 for use in the present invention are shown in FIGS. 5–7. The adapter 30 has a main block or body member 92 and a protruding interconnector member 94. The interconnector member 94 has a generally "figure 8"-shaped opening 96 which facilitates passage of material from the twin-screws of the side feeder 22 into the main extruder. The front curved surface 98 of the interconnecting member 94 is shaped to blend in with the side of the main opening or passageway in the barrel 14 of the main extruder 10. A plurality of openings 100 are provided in the body 92 for connecting the adapter 30 to the side feeder 22 and main extruder 10. Bolts or other fasteners are positioned in the openings 100 and used to connect the two extruders and adapter together.

With the use of the adapter 30, the screws and other elements in the barrel 26 of the side feeder 22 can be removed and worked on without moving the side feeder relative to the main extruder. In this manner, changes and repairs can be made to the side feeder, motor, and control mechanism 24 and the barrel 26 without having to move any parts of the side feeder away from the main extruder or having to disturb any of the cooling lines, connectors and other electrical conduits and lines. In particular, this adapter 30 allows the screw member and shafts in the barrel in the side feeder to be retracted and removed without separation of the side feeder from the main extruder. This saves space in the manufacturing facility and also makes repair and modification of the side feeder to be done more easily and at less cost.

While there have been described what are presently believed to be the preferred embodiments of the invention, those skilled in the art will realize that changes and modifications may be made thereto without departing from the spirit and scope of the invention, and it is intended to claim all such changes and modifications that fall within the true scope of the invention as defined and covered by the following claims.

What is claimed is:

1. An adapter member for connecting a side feeder extruder to a main extruder, the side feeder extruder having a first barrel with a first internal distal end, and a first screw mechanism, the main extruder having a second barrel with a second barrel separated from one another without any overlap of said first and second screw members and with said adapter member adapted to be positioned therebetween and operationally connecting the main extruder and side feeder extruder together, said adapter member comprising a body member and an insert member, said body member having a first surface adapted to be attached to said distal end of said first barrel and a second surface to be attached to said second barrel, said insert member positioned on said second surface and having a curved outer end shaped to blend with the second internal bore of the main extruder, said adapter having a passageway therethrough for communicating said first internal bore with second internal bore for passage of materials therethrough, wherein said adapter member allows maintenance and removal of said first screw member without having to move said side feeder extruder away from said main extruder.

2. A system for interconnecting a main extruder and a side feeder extruder, comprising:

a main extruder having a first barrel with a first internal bore and a first screw member positioned therein;

a side feeder extruder having a second barrel with a second internal bore and a distal end, said side feeder extruder having a second screw member positioned in said second barrel;

said side feeder extruder being positioned adjacent to and not overlapping said main extruder with a gap between said distal end of said second barrel and said first barrel; and an adapter member positioned in said gap, said adapter member having a body member and an insert member, said body member having a first portion attached to said first barrel of said main extruder and a second portion attached to said distal end of said second barrel of said side feeder extruder, said insert member positioned on said first portion and having a curved outer end shaped to blend with the curvature of the first internal bore, said adapter member having a passageway therethrough for communicating said first internal bore with said second internal bore for passage of materials, wherein access to and maintenance of said second screw member can be achieved without repositioning of said feeder extruder relative to said main extruder member.

* * * * *